(12) United States Patent
Feigel

(10) Patent No.: US 10,940,834 B2
(45) Date of Patent: Mar. 9, 2021

(54) ELECTRONIC BRAKE SYSTEM

(71) Applicant: MANDO CORPORATION, Gyeonggi-do (KR)

(72) Inventor: Hans Joerg Feigel, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 121 days.

(21) Appl. No.: 15/981,894

(22) Filed: May 17, 2018

(65) Prior Publication Data

US 2018/0334147 A1  Nov. 22, 2018

(30) Foreign Application Priority Data

May 17, 2017 (KR) .......................... 10-2017-0061058

(51) Int. Cl.
| | |
|---|---|
| *B60T 8/40* | (2006.01) |
| *B60T 7/04* | (2006.01) |
| *B60T 13/74* | (2006.01) |
| *B60T 13/14* | (2006.01) |
| *B60T 13/66* | (2006.01) |
| *B60T 13/68* | (2006.01) |

(52) U.S. Cl.
CPC ............ *B60T 7/042* (2013.01); *B60T 8/4081* (2013.01); *B60T 13/148* (2013.01); *B60T 13/662* (2013.01); *B60T 13/686* (2013.01); *B60T 13/745* (2013.01); *B60T 8/409* (2013.01); *B60T 2270/404* (2013.01)

(58) Field of Classification Search
CPC ...... B60T 7/042; B60T 13/575; B60T 13/662; B60T 13/686; B60T 13/745

USPC .......... 303/114.1; 188/358–360; 60/533–590
See application file for complete search history.

(56) References Cited

U.S. PATENT DOCUMENTS

| | | | |
|---|---|---|---|
| 4,674,805 A | 6/1987 | Leiber | |
| 9,969,375 B2 * | 5/2018 | Weiberle | ............... B60T 11/224 |

(Continued)

FOREIGN PATENT DOCUMENTS

| | | |
|---|---|---|
| CN | 102015392 | 4/2011 |
| CN | 102869552 | 1/2013 |

(Continued)

OTHER PUBLICATIONS

Office Action dated Sep. 20, 2019 for Chinese Patent Application No. 201810471645.1 and its English machine translation by Google Translate.

*Primary Examiner* — Christopher P Schwartz
(74) *Attorney, Agent, or Firm* — Ladas & Parry, LLP

(57) ABSTRACT

An electronic brake system is disclosed. The electronic brake system includes a first housing having a first cylinder chamber hydraulically connected to a wheel brake unit, a first piston connected to a pedal unit so as to press an operating fluid stored in the first cylinder chamber toward the wheel brake unit, and a second cylinder chamber connected to a reservoir unit through a flow passage opened or closed by an electronic control valve. The electronic brake system includes the second cylinder chamber, a volume of which is decided by forward and backward movement of a second piston. The second piston is activated by at least one interlocking unit such that forward and backward movement of the first piston and forward and backward movement of the second piston are performed independently of each other.

19 Claims, 15 Drawing Sheets

(56) References Cited

U.S. PATENT DOCUMENTS

| | | | | |
|---|---|---|---|---|
| 2011/0297493 | A1* | 12/2011 | Vollert | B60T 13/575 |
| | | | | 188/106 R |
| 2014/0345272 | A1* | 11/2014 | Kistner | B60T 13/662 |
| | | | | 60/537 |
| 2017/0253225 | A1* | 9/2017 | Lopez | B60T 7/04 |
| 2018/0312150 | A1* | 11/2018 | Gonzalez | B60T 8/326 |
| 2018/0326960 | A1* | 11/2018 | Knechtges | B60T 13/741 |
| 2018/0334149 | A1* | 11/2018 | Feigel | B60T 8/4081 |
| 2019/0016317 | A1* | 1/2019 | Masuda | B60T 8/17 |

FOREIGN PATENT DOCUMENTS

| | | |
|---|---|---|
| DE | 10 2008 012 847 | 9/2009 |
| DE | 10 2013 105 377 | 11/2014 |
| EP | 2 520 473 | 11/2012 |
| JP | 2006-151180 | 6/2006 |
| JP | 2007-38698 | 2/2007 |
| KR | 10-2015-0040714 | 4/2015 |

* cited by examiner

ELECTRONIC BRAKE SYSTEM

CROSS-REFERENCE TO RELATED APPLICATION

This application is based on and claims priority under 35 U.S.C. § 119 to Korean Patent Application No. 10-2017-0061058, filed on May 17, 2017 in the Korean Intellectual Property Office, the disclosure of which is incorporated by reference in its entirety.

BACKGROUND

1. Field

Embodiments of the present disclosure relate to an electronic brake system, and more particularly to an electronic brake system for generating a braking force using an electrical signal corresponding to a displacement of a brake pedal.

2. Description of the Related Art

A brake system for braking of a vehicle is essentially mounted to a vehicle, and various systems have recently been proposed to obtain stronger and more stable braking force.

Examples of brake systems include anti-lock brake systems (ABSs) to prevent slippage of wheels during braking, brake traction control systems (BTCSs) to prevent slippage of driving wheels during sudden unintended acceleration from a stop or upon rapid acceleration of a vehicle, and electronic stability control systems (ESCs) to stably maintain a driving state of vehicles by controlling a brake hydraulic pressure through combination of an anti-lock brake (ABS) system with a brake traction control system.

Generally, an electronic brake includes an actuator. Once a driver pushes a brake pedal, the actuator senses displacement of the pedal through a pedal displacement sensor, and receives an electric signal indicating the driver's braking intention from the pedal displacement sensor, such that pressure is supplied to the wheel cylinder.

An electronic brake system provided with such an actuator has been disclosed in European Registered Patent No. EP 2 520 473. According to this European Patent document, the actuator is configured such that a motor is activated according to a pedal effort of a brake pedal to generate braking pressure. At this point, the braking pressure is generated by converting a rotational force of the motor into a rectilinear movement to pressurize a piston.

CITED REFERENCE

Patent Document

European Registered Patent No. EP 2 520 473 A1 (Honda Motor Co., Ltd.), (Nov. 7, 2012)

SUMMARY

Therefore, it is an aspect of the present disclosure to provide an electronic brake system for generating braking force using a double-acting actuator.

It is another aspect of the present disclosure to provide an electronic brake system for coping with a faulty operation of the actuator.

Additional aspects of the invention will be set forth in part in the description which follows and, in part, will be obvious from the description, or may be learned by practice of the invention.

In accordance with an aspect of the present disclosure, an electronic brake system includes a first housing having a first cylinder chamber hydraulically connected to a wheel brake unit, a first piston connected to a pedal unit so as to press an operating fluid stored in the first cylinder chamber by the wheel brake unit, and a second cylinder chamber connected to a reservoir unit through a flow passage opened or closed by an electronic control valve. The electronic brake system includes the second cylinder chamber, a volume of which is decided by forward and backward movement of a second piston. The second piston is activated by at least one interlocking unit such that forward and backward movement of the first piston and forward and backward movement of the second piston are performed independently of each other.

The interlocking unit may include a first protrusion member provided to a push rod, configured to directly press the second piston or to indirectly press the second piston through an extension member provided to the second piston.

The forward and backward movement of the first piston and the forward and backward movement of the second piston may be independently performed either by a separation space between the plurality of interlocking units or by a separation space between the second piston and the interlocking units.

The forward and backward movement of the first piston and the forward and backward movement of the second piston may be independently performed either by an elastic element disposed between the plurality of interlocking units or by an elastic element disposed between the second piston and the interlocking units.

The forward and backward movement of the first piston and the forward and backward movement of the second piston may be independently performed either by a separation space and an elastic element disposed between the plurality of interlocking units or by a separation space and an elastic element disposed between the second piston and the interlocking units.

The electronic brake system may further include a movement restriction member disposed between the second piston and the interlocking units, configured to restrict a contraction range of the elastic element.

The electronic brake system may further include a volume elastic unit hydraulically connected to the second cylinder chamber.

The electronic brake system may further include a first elastic member configured to provide elastic force in a backward direction of the first piston.

The second piston may be in contact with the first piston by backward movement of the first piston, and the second piston may move backward along with the first piston.

The electronic brake system may further include a fixed-type first sealing member mounted to an inner surface of the first housing.

The electronic brake system may further include a second housing configured to form a space in which the second piston moves forward and backward.

The second housing may be connected in series to the first housing.

The first piston may include an overhang part guided by an inner surface of the second housing in which the second piston moves forward and backward.

The overhang part may include an overhang orifice to generate flow resistance.

The electronic brake system may further include a third piston provided at a front of the first piston such that the first cylinder chamber and a third cylinder chamber are divided from each other by the third piston. Each of the first cylinder chamber and the third cylinder chamber is connected to at least one wheel brake unit.

The first piston or the third piston may include a flow passage that is opened by backward movement of the first or third piston or is closed by forward movement of the first or third piston.

The electronic brake system may further include a brake line configured to interconnect the first cylinder chamber and a wheel brake unit, and a reservoir line configured to interconnect the first cylinder chamber and a reservoir unit.

The electronic brake system may further include a simulator line configured to interconnect the second cylinder chamber and a reservoir unit, and a check valve connected in parallel to the electronic control valve through the simulator line so as to permit only one-way flow ranging from the reservoir unit to the second cylinder chamber.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
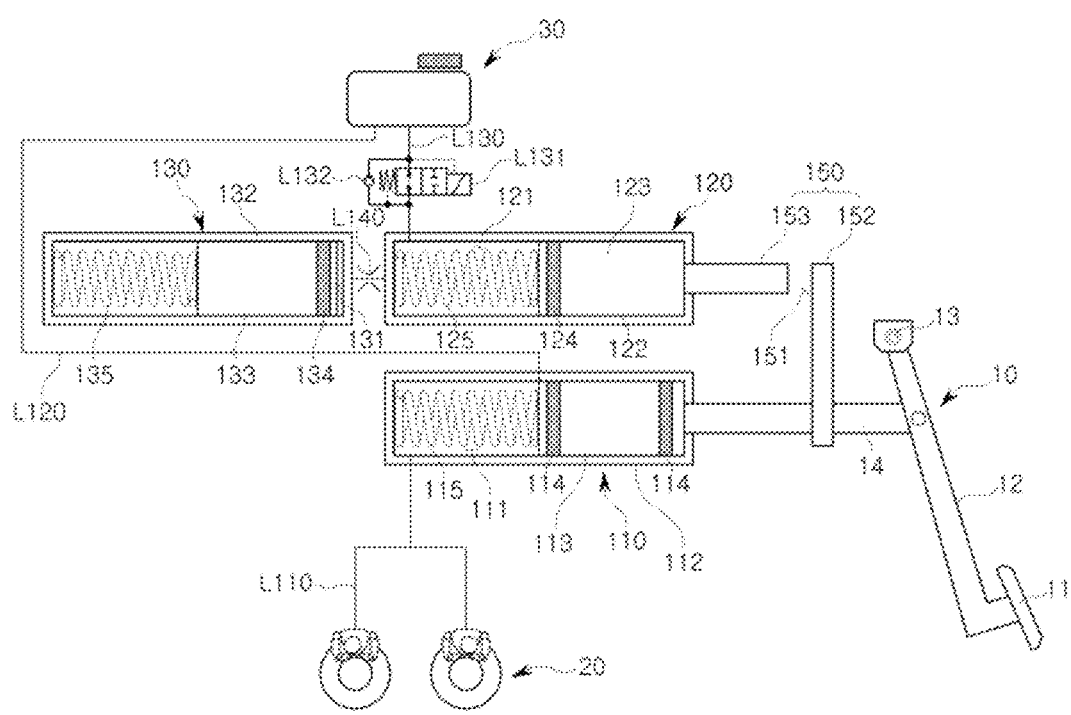
FIG. 1 is a view illustrating an electronic brake system according to a first embodiment of the present disclosure.

Reference will now be made in detail to the embodiments of the present disclosure, examples of which are illustrated in the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also the size of the component may be exaggerated or reduced for convenience and clarity of description.

FIG. 1 is a view illustrating an electronic brake system according to a first embodiment of the present disclosure.

Referring to FIG. 1, the electronic brake system according to the first embodiment may broadly include a first cylinder part 110, a second cylinder part 120, a pedal unit 10, a wheel brake unit 20, and a reservoir unit 30.

The pedal unit 10 may transmit forward force (or propulsive force) to a first piston 113 upon receiving the driver's braking intention. The pedal unit 10 may broadly include a pedal member 11 to directly receive a pedal effort, a pivoting member 12 pressed by the pedal member 11 so as to pivotably move about a hinge member 13, and a push rod 14 connected to a first piston 113 to be described later. The pedal unit 140 may be used for the electronic brake system, may receive an electric signal indicating the driver's braking intention from a pedal displacement sensor, and may provide pressure to a first cylinder part 110 to be described later using the received electric signal.

The wheel brake unit 20 may include a caliper pressed by an operating fluid, and a wheel braked by the caliper. The wheel brake unit 20 may be pressed by the operating fluid delivered through a brake line L110 so as to brake wheels, such that braking force may occur in the vehicle.

The reservoir unit 30 may be a means for storing the operating fluid therein and supplying the operating fluid to the brake system, and may be a reservoir, an upper part of which is provided with an inlet through which the operating fluid can be additionally received from the external part. Although various kinds of reservoir units 30 are shown in the respective drawings and the respective reservoir units 30 are denoted by the same reference numbers for convenience of description, the scope or spirit of the disclosure is not limited thereto, and the reservoir unit 30 may be constructed of different constituent elements.

The first cylinder part 110 may include a first piston 113, a first elastic member 115, a first cylinder chamber 111, and a first sealing member 114. The first piston 113 may be connected to the push rod 14, and may move forward or backward along an inner surface of a first housing 112 according to the operation of the pedal unit 10. The first elastic member 115 may provide the first piston 113 with elastic force in the backward direction. The first cylinder chamber 111 may accommodate the operating fluid therein. The first sealing member 114 may seal a gap or space between the first piston 113 and the first housing 112.

The first housing 112 may have a gap or space in which the first piston 113 reciprocates, and may form an opening in a flow passage toward the reservoir unit 30 or the wheel brake unit 20. The first housing 112 may include the first cylinder chamber 111, a volume of which is changed by the first piston 113.

The first cylinder chamber 111 may have a gap or space enclosed by the first piston 113 and the inner surface of the first housing 112, may store the operating fluid therein, and may be pressed by the pedal unit 10. Under the condition that the first cylinder chamber 111 is disposed to communicate with the brake line L110 through the reservoir line L120 at ordinary times, the reservoir line L120 is then closed when the first piston 112 moves forward in a manner that the operating fluid is supplied to the brake line L110, such that braking force may occur in the wheel brake unit 20.

The first piston 113 reciprocating in the first cylindrical housing 112 may control the first cylinder chamber 111 to be contracted by a pedal effort of the pedal unit 10, such that the operating fluid can be supplied to the wheel brake unit 20. In this case, the first sealing member 114 may be provided at the outer circumferential surface of the first piston 113, such that the operating fluid stored in the first cylinder chamber 111 is prevented from leaking in the backward direction of the first piston 113.

The first elastic member 115 may be a compression spring that is compressed by forward movement of the first piston 113 and provides elastic force in the backward direction of the piston 113. In this case, forward movement of the first piston 113 may indicate that the first piston 113 moves in the direction along which a volume of the first cylinder chamber 111 is contracted (reduced), and backward movement of the first piston 113 may indicate that the first piston 113 moves in the other direction along which the volume of the first cylinder chamber 111 is expanded (increased).

The second cylinder part 120 may include a second piston 123, a second cylinder chamber 121, a second sealing member 124, and a second elastic member 125. The second piston 123 may move forward or backward along the inner surface of the second housing 122 by an interacting unit 150 coupled to the push rod 14. The second cylinder chamber 121 may accommodate the operating fluid therein. The second sealing member 124 may seal a gap or space between the second piston 123 and the first housing 112. The second elastic member 125 may supply elastic force to the second piston 123. A volume of the second cylinder chamber 121 may be decided by forward and backward movement of the second piston 123. The forward and backward movement of the first piston 113 may be performed independently of the forward and backward movement of the second piston 123.

The second housing 122 may have a gap or space in which the second piston 123 reciprocates, and may form an opening in a flow passage toward the reservoir unit 30. The second housing 122 may include the second cylinder chamber 121, a volume of which is changed by the second piston 123.

The second cylinder chamber 121 may have a gap or space enclosed by the second piston 123 and the inner surface of the second housing 122, may store the operating fluid therein, and may have a volume that is changeable by the second piston 123 pressed by a first protrusion member 152. The volume of the second cylinder chamber 121 is contracted (reduced) when the second piston 123 moves forward, and is then expanded (increased) when the second piston 123 moves back to the original position thereof by the second elastic member 125.

The second piston 123 reciprocating in the second cylindrical housing 122 may control the second cylinder chamber 121 to be contracted by force that is delivered from the pedal unit 120 to an extension member 153 through the first protrusion member 152, thereby providing better pedal feel to the driver of the vehicle. In this case, the second sealing member 124 may be provided at the outer circumferential surface of the second piston 123, such that the operating fluid stored in the second cylinder chamber 121 is prevented from leaking in the backward direction of the second piston 123.

The second elastic member 125 may be a compression spring that is compressed by forward movement of the first piston 113 and provides elastic force in the backward direction of the piston 123. In this case, the forward movement of the second piston 123 may indicate that the second piston 123 moves in the direction along which a volume of the second cylinder chamber 121 is contracted (reduced), and the backward movement of the second piston 123 may indicate that the second piston 123 moves in the direction along which a volume of the second cylinder chamber 121 is expanded (increased).

The volume elastic unit 130 may include a volume elastic unit chamber 131, a volume elastic unit piston 133, a volume elastic unit housing 132, a sealing member 134, and an elastic member 135. The volume elastic unit chamber 131 may store the operating fluid therein. The volume elastic unit housing 132 may form a space in which the volume elastic unit piston 133 moves forward and backward. The sealing member 134 may seal the volume elastic unit chamber 131. The elastic member 135 may provide elastic force to the volume elastic unit piston 133. In this case, the volume elastic unit chamber 131 may be located opposite to the elastic member 135 of the volume elastic unit 130 with respect to the volume elastic unit piston 133. The volume elastic unit chamber 131 may be connected to the second cylinder chamber 121 through a coupling part L140, such that the volume elastic unit chamber 131 may rapidly exchange the operating fluid with the second cylinder chamber 121.

In other words, the volume elastic unit 130 may have an empty space located at the front of the volume elastic unit piston 133, and the volume elastic unit chamber 131 may be provided at the rear of the volume elastic unit piston 133. In this case, forward movement of the volume elastic unit piston 133 may indicate that the volume elastic unit piston 133 moves in the expansion direction of the volume elastic unit chamber 131, and backward movement of the volume elastic unit piston 133 may indicate that the volume elastic unit piston 133 moves in the contraction direction of the volume elastic unit chamber 131.

The interlocking unit 150 may be a means for transmitting force received from the pedal unit 10 or the first cylinder part 110 to the second cylinder part 120. The interlocking unit 150 may include the first protrusion member 152 and the extension member 153. The first protrusion member 152 may protrude in the lateral direction of the push rod 14. The extension member 153 may protrude in the direction from the second piston 123 to the outside of the second housing 122, and may be spaced apart from the first protrusion member 152 by a separation space 151.

The separation space 151 may allow the pedal unit 10 to sequentially press the first cylinder part 110 and the second cylinder part 120. In more detail, after the first cylinder chamber 111 is first compressed by the first piston 113 moving forward by the pedal unit 10, the first piston 113 moves forward by the separation space 151, such that the first protrusion member 152 then presses the second piston 123. In this case, the first protrusion member 152 may protrude in the lateral direction of the push rod 14, and may press the extension member 152 that is connected to the second piston 123 and protrudes outward from the second housing 122.

The brake line L110 may connect the first cylinder chamber 111 to the wheel brake unit 20, and may supply the operating fluid pressed by contraction of the first cylinder chamber 111 to the caliper of the wheel brake unit 20, such that braking force may be delivered to wheels.

The reservoir line L120 may connect the first cylinder chamber 111 to the reservoir unit 30, and may thus supply the operating fluid stored in the reservoir unit 30 to the first cylinder chamber 111. In this case, the reservoir line L120 may be disposed adjacent to the front of the first piston 113 within the first cylinder part 110, such that the reservoir line L120 may be closed by operation of the pedal unit 10. The operating pedal unit 10 may allow the push rod 14 to press the first piston 113, such that the first sealing member 114 may close a flow passage between the first cylinder chamber 111 and the reservoir line L120 by forward movement of the first piston 113.

A simulator line L130 may connect the reservoir unit 30 to the second cylinder chamber 121, such that the operating fluid may be supplied to the second cylinder chamber 121 or may return to the reservoir unit 30. The simulator line L130 may include an electronic control valve L131 and a check valve L132. The electronic control valve L131 may be controlled by an electronic control unit (ECU). The check valve L132 may be arranged parallel to the electronic control valve L131, and may allow the operating fluid to flow from the reservoir unit 30 only to the second cylinder chamber 121. That is, the check valve L132 may act as a one-way valve. The ECU is a control device to adjust an operation mode of the brake system. The ECU may open or close the electronic control valve L131 or the like according to a control scheme based on any one of various modes, for example, a general operation mode, a fallback mode, etc.

The coupling part L140 may be a connector disposed between the second cylinder part 20 and the volume elastic unit 30, such that a volume of the volume elastic unit chamber 131 may be changed by pressure generated in the second cylinder chamber 121.

The electronic brake system according to the first embodiment has been disclosed as described above. The operation scheme of the above-mentioned electronic brake system according to the first embodiment will hereinafter be described in detail. The operation scheme of the electronic brake system according to the first embodiment may be broadly classified into a Brake-by-Wire mode used in a general state and a fallback mode used in a faulty state, such that the electronic brake system may be driven by the ECU in different ways according to various situations.

In the Brake-by-Wire mode, the reservoir line L120 is opened by activation of the pedal unit 10 and pressure is not applied to the inside of the first cylinder chamber 111, such that braking force is not directly delivered to the wheel brake unit 20. However, pressure may occur in the second cylinder chamber 121, such that the driver of the vehicle may feel a pedal effort. In this case, the driver's braking intention may be delivered electrically. For example, an actuator (not shown) capable of electrically generating braking force may be provided, such that the braking force may be supplied to the wheel brake unit 20.

In the fallback mode indicating a faulty situation, the simulator line L130 may be opened by activation of the pedal unit 10, such that pressure is not applied to the second cylinder chamber 121. Then, the brake line L110 is opened and the reservoir line L120 is closed, and pressure is applied to the first cylinder chamber 111, such that braking force is directly supplied from the first cylinder chamber 111 to the wheel brake unit 20.

As described above, the above-mentioned constituent elements are combined with one another in a manner that each of the first piston 113 and the second piston 123 may move forward and backward, such that the first cylinder chamber 111 and the second cylinder chamber 121 may be contracted at different times.

The above-mentioned electronic brake system according to the first embodiment may further include the volume elastic unit 130 provided with the volume elastic unit chamber 131 communicating with the second cylinder chamber 121, thereby providing better pedal effort (pedal feel) to the driver.

Figure 2:
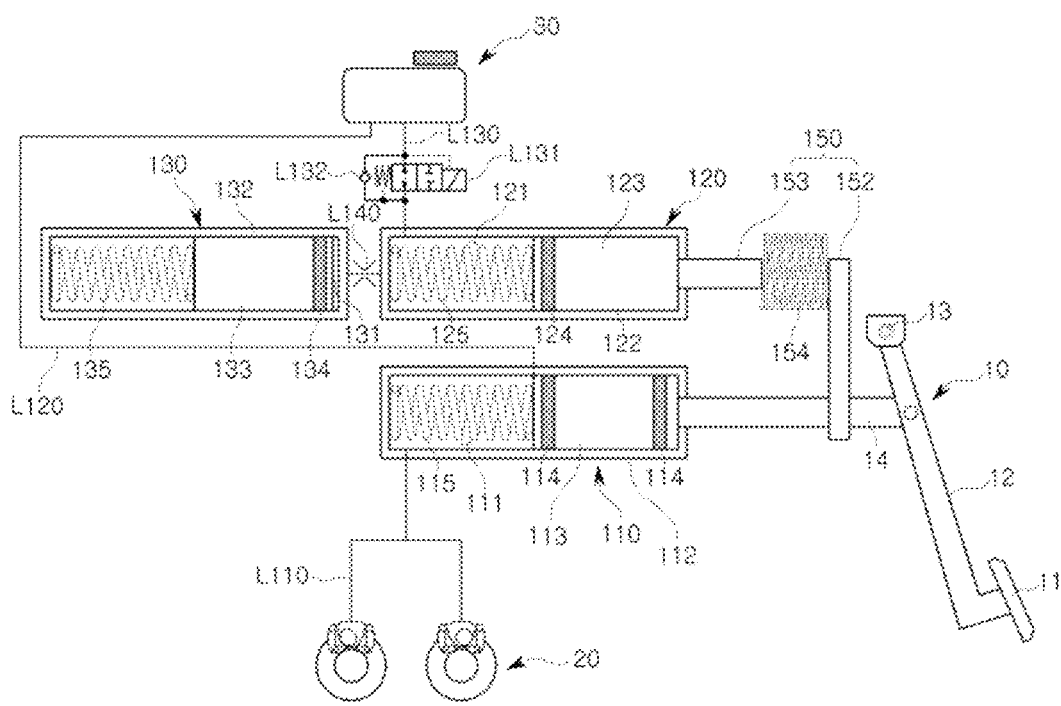
FIG. 2 is a view illustrating an electronic brake system according to a second embodiment of the present disclosure.
Figure 3:
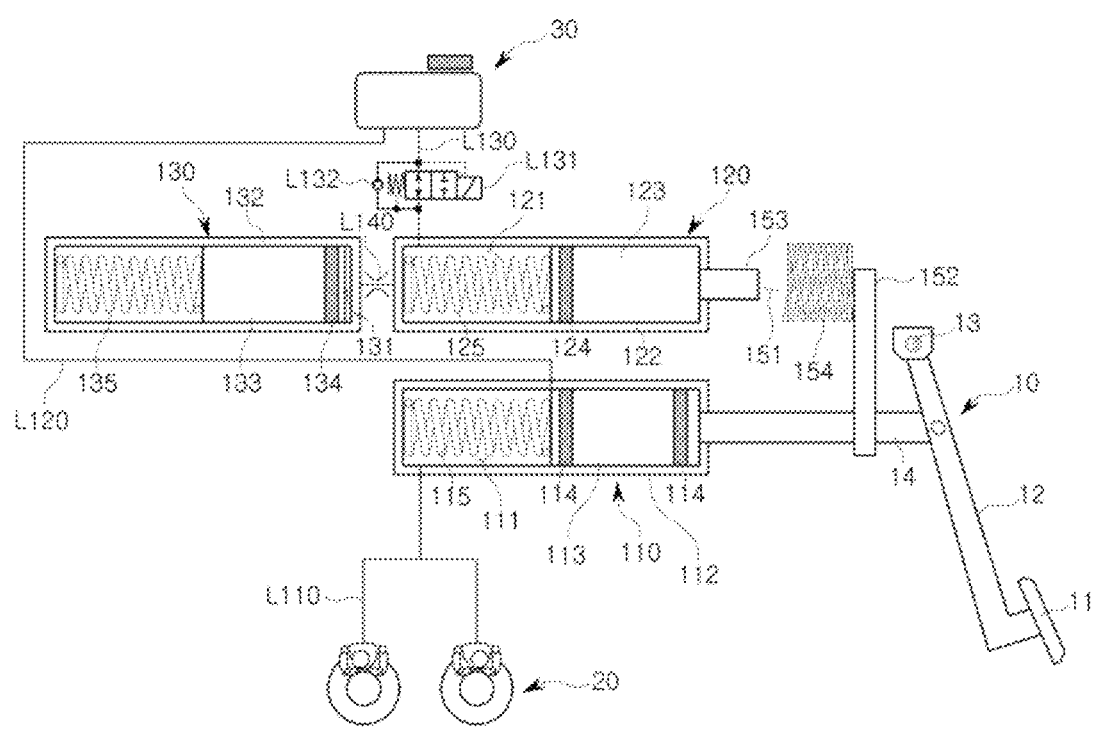
FIG. 3 is a view illustrating an electronic brake system according to a third embodiment of the present disclosure.
Figure 4:
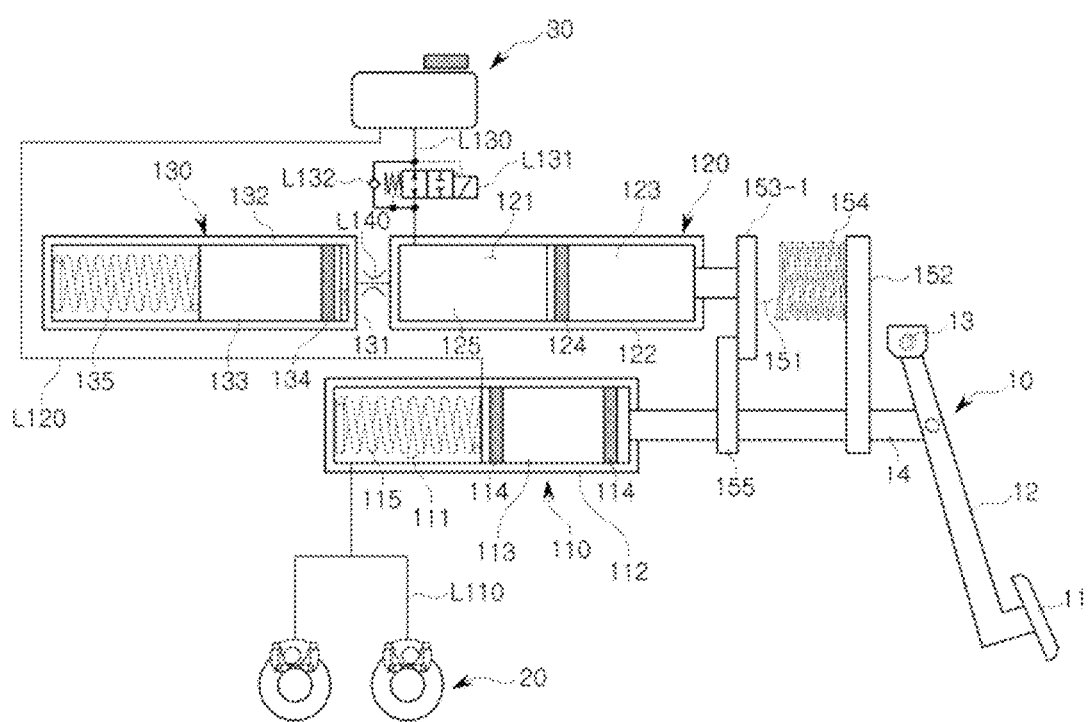
FIG. 4 is a view illustrating an electronic brake system according to a fourth embodiment of the present disclosure.
Figure 5:
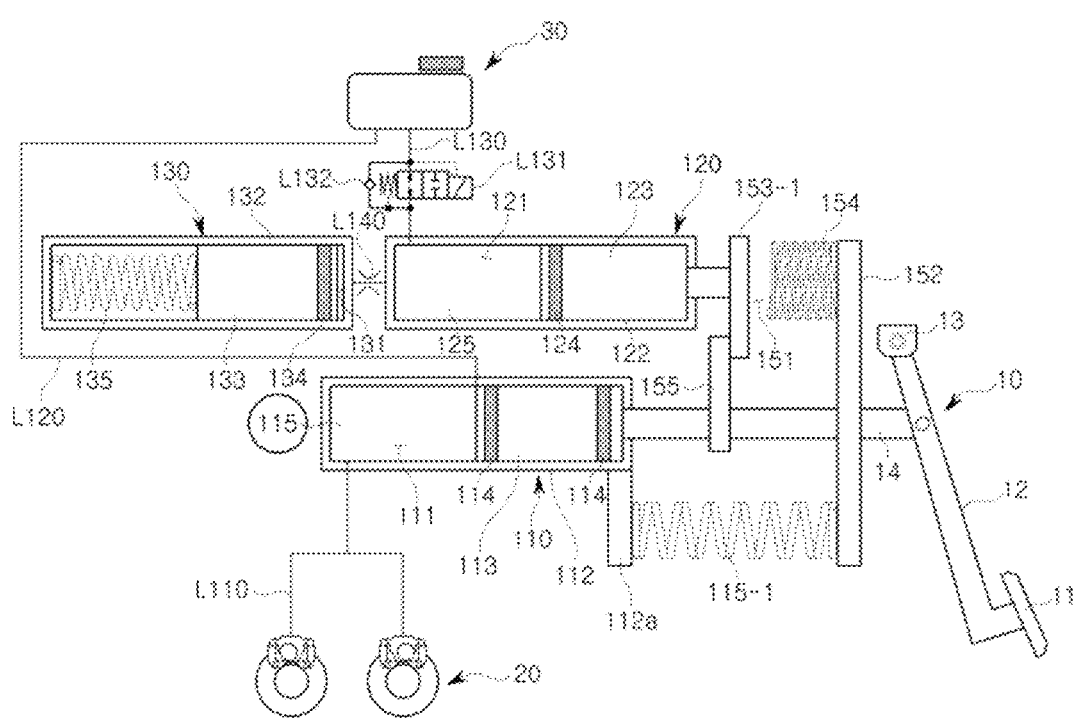
FIG. 5 is a view illustrating an electronic brake system according to a fifth embodiment of the present disclosure.

FIG. 2 is a view illustrating an electronic brake system according to a second embodiment of the present disclosure. FIG. 3 is a view illustrating an electronic brake system according to a third embodiment of the present disclosure. FIG. 4 is a view illustrating an electronic brake system according to a fourth embodiment of the present disclosure. FIG. 5 is a view illustrating an electronic brake system according to a fifth embodiment of the present disclosure. Hereinafter, the following electronic brake systems of the second to fifth embodiments shown in FIG. 2 to 5 are substantially identical in operation to the electronic brake system of the first embodiment, and as such a detailed description thereof will herein be omitted for convenience of description. Only the remaining elements denoted by additional reference numbers will hereinafter be given with reference to FIGS. 2 to 5.

Referring to FIG. 2, an elastic element 154 instead of the separation space 151 may be disposed between the first protrusion member 152 and the extension member 153. In a third embodiment of FIG. 3 in a similar way to FIG. 2, the separation space 151 and the elastic element 154 may be disposed between the first protrusion member 152 and the extension member 153.

The elastic element 154 disposed between the extension member 153 and the first protrusion member 152 may mitigate impact generated between the extension member 153 and the first protrusion member 152. The first protrusion member 152 may move forward simultaneously with the push rod 14 moving forward, such that impact applied to the extension member 153 is reduced.

As described above, according to the second and third embodiments, the elastic element 154 may be inserted between the first protrusion member 152 and the second piston 123, such that the first cylinder chamber 111 and the second cylinder chamber are contracted at different times and impact generated by contact between the first protrusion member 152 and the second piston 123 is mitigated, thereby providing better pedal feel to the driver of the vehicle.

In accordance with a fourth embodiment shown in FIG. 4, the push rod 14 may further include a second protrusion member 155, and the second piston 123 may move backward along with the first piston 113 by the first elastic member 115. In this case, an extension member 153-1 may be provided with a stopper projection formed in the lateral direction. During backward movement of the second protrusion member 153-a, the second protrusion member 155 is caught in the stopper projection, such that the second piston 123 also moves backward. As a result, a means for the backward movement (retreating) the second piston 123 need not be used, such that production costs can be reduced and cylinders can be more efficiently manufactured.

FIG. 5 is a view illustrating an electronic brake system according to a fifth embodiment of the present disclosure. Referring to FIG. 5, the electronic brake system according to the fifth embodiment may include a first elastic member 115-1 to provide elastic force in the backward direction (retreating direction) of the first piston 113. The first elastic member 115-1 may be disposed between the first protrusion member 152 and a protrusion part 112a provided in the first housing 112. Differently from the fourth embodiment, the electronic brake system of the fifth embodiment is provided with the first elastic member 115-1 disposed outside the first housing 112.

Figure 6:
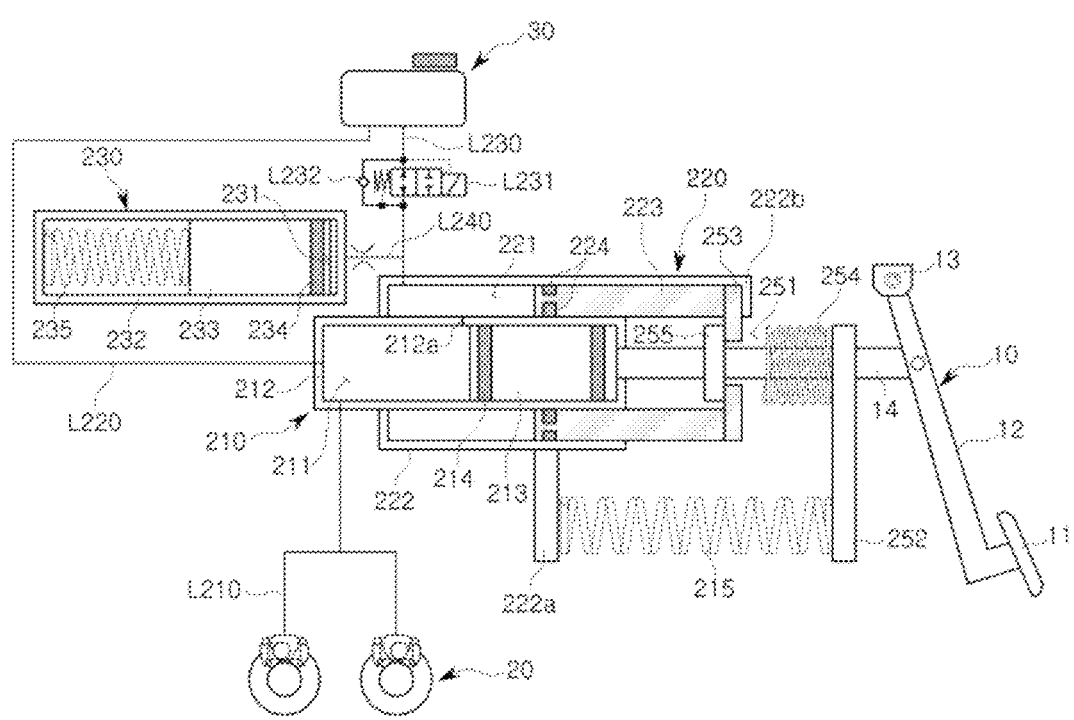
FIG. 6 is a view illustrating an electronic brake system according to a six embodiment of the present disclosure.
Figure 7:
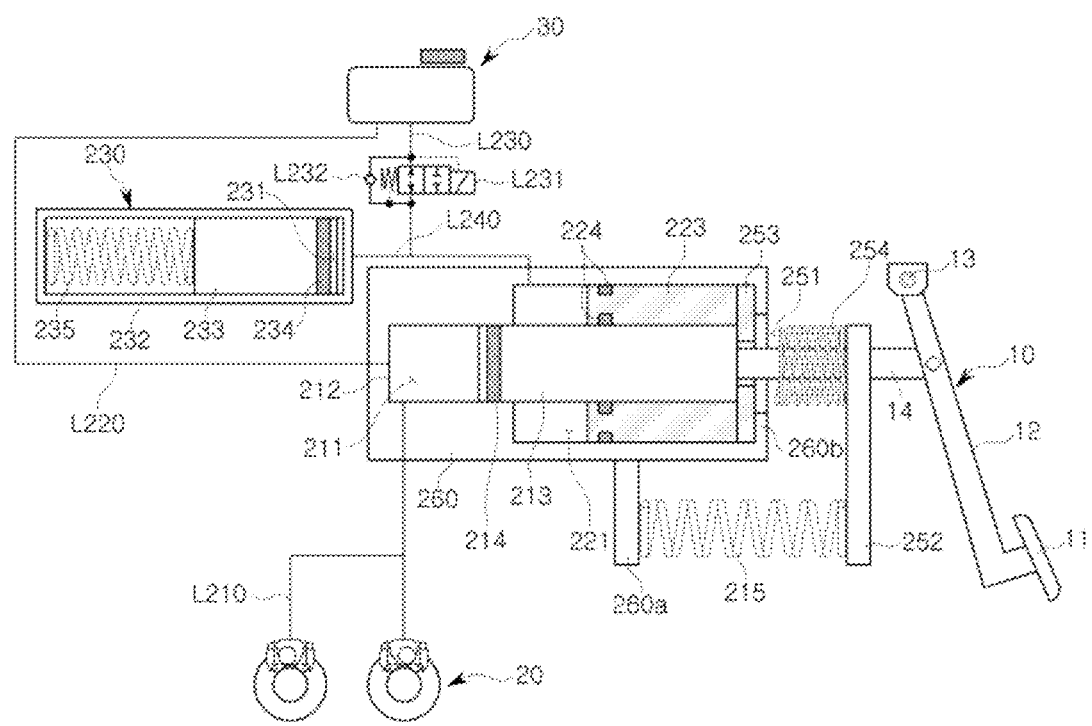
FIG. 7 is a view illustrating an electronic brake system according to a seventh embodiment of the present disclosure.
Figure 8:
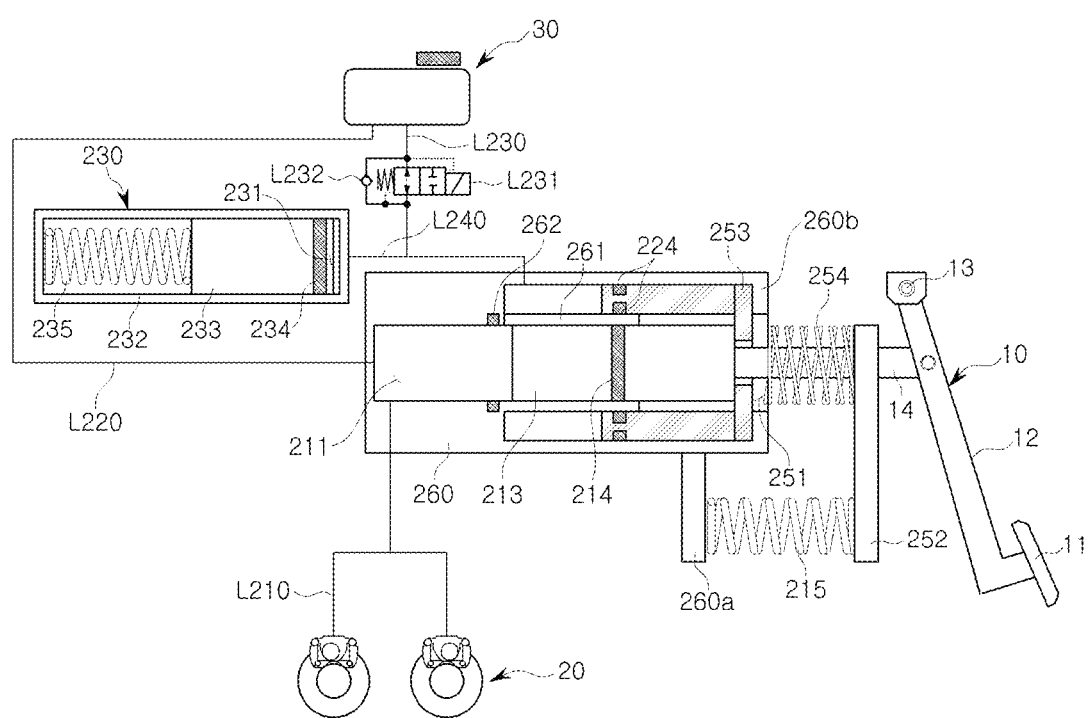
FIG. 8 is a view illustrating an electronic brake system according to an eighth embodiment of the present disclosure.
Figure 9:
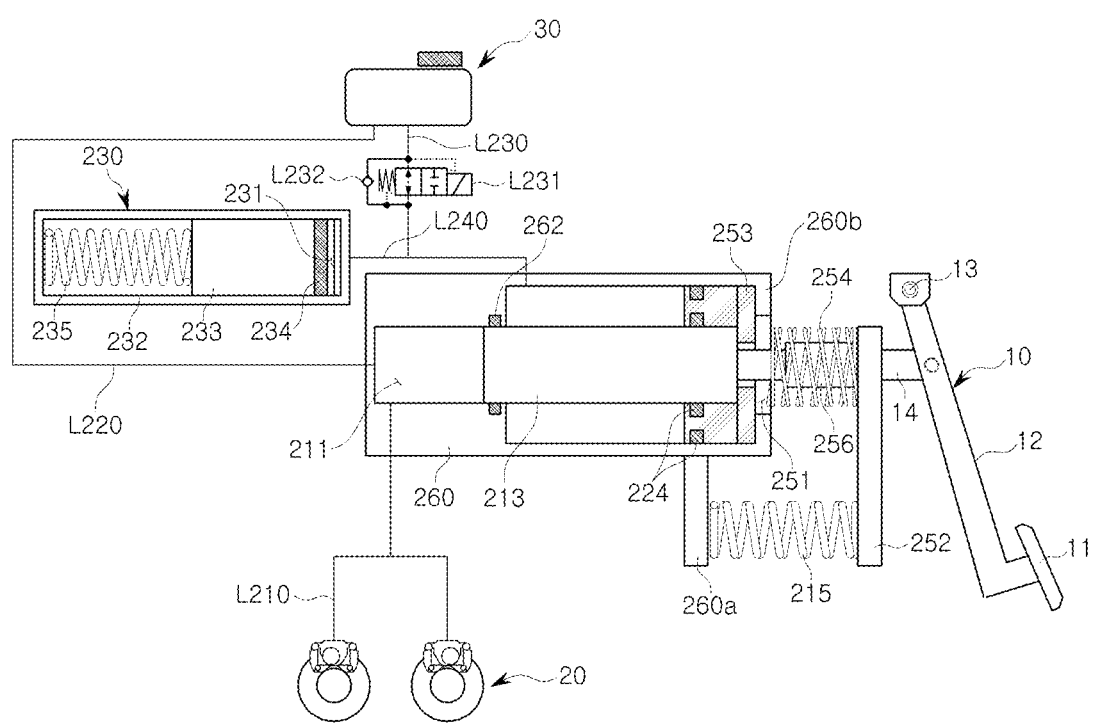
FIG. 9 is a view illustrating an electronic brake system according to a ninth embodiment of the present disclosure.

FIG. 6 is a view illustrating an electronic brake system according to a six embodiment of the present disclosure. FIG. 7 is a view illustrating an electronic brake system according to a seventh embodiment of the present disclosure. FIG. 8 is a view illustrating an electronic brake system according to an eighth embodiment of the present disclosure. FIG. 9 is a view illustrating an electronic brake system according to a ninth embodiment of the present disclosure.

Referring to FIG. 6, the electronic brake system according to the sixth embodiment may broadly include a first cylinder part 210, a second cylinder part 220, a pedal unit 10, a wheel brake unit 20, and a reservoir unit 30.

The electronic brake system according to the sixth embodiment may include the first cylinder part 210 in the second cylinder part 220. That is, a first housing 212 and a second housing 222 may be coupled in series to each other so that the first housing 212 and the second housing 222 are incorporated into one body. In this case, a flow passage 212a may be formed between a second cylinder chamber 221 and the first housing 212 provided with the first cylinder chamber 211. The flow passage 212a may be opened at an initial position of the first piston 212, and may be closed by forward movement of the first piston 213.

The first cylinder part 210 may generate hydraulic pressure in the first cylinder chamber 211 by the first piston 213 pressed by the push rod 14, such that the operating fluid may be supplied to the wheel brake unit 20 or the reservoir unit 30. The first cylinder part 210 may include the first housing 212 in which the first piston 213 moves forward and backward, a first sealing member 214 provided at the outer surface of the first piston 213 so as to maintain airtightness with the first housing 212, and a first elastic member 215 disposed between a protrusion part 222a and a first protrusion member 252 (not shown) so as to provide elastic force. In this case, the first sealing member 214 provided at the front of the first piston 213 may prevent the operating fluid from flowing between the first cylinder chamber 211 and the second cylinder chamber 221 during forward movement of the first piston 213.

The first housing 212 may have a gap or space in which the first piston 213 reciprocates, and may form an opening in a flow passage toward the reservoir unit 30 or the wheel brake unit 20. The first housing 212 may include the first cylinder chamber 211, a volume of which is changed by the first piston 213.

The first cylinder chamber 211 may have a gap or space enclosed by the first piston 213 and the inner surface of the first housing 212, may store the operating fluid therein, and may be pressed by the pedal unit 10. Under the condition that the first cylinder chamber 211 is disposed to communicate with the brake line L210 through the reservoir line L220 at ordinary times, the reservoir line L220 is then closed when the first piston 212 moves forward in a manner that the operating fluid is supplied to the brake line L210, such that braking force may occur in the wheel brake unit 20.

The first piston 213 reciprocating in the first cylindrical housing 212 may control the first cylinder chamber 211 to be contracted by a pedal effort of the pedal unit 10, such that the operating fluid can be supplied to the wheel brake unit 20. In this case, the first sealing member 214 may be provided at the outer circumferential surface of the first piston 213, such that the operating fluid stored in the first cylinder chamber 211 is prevented from leaking in the backward direction of the first piston 213.

The first elastic member 215 may be a compression spring that is compressed by forward movement of the first piston 213 and provides elastic force in the backward direction of the piston 213. In this case, the forward movement of the first piston 213 may indicate that the first piston 213 moves in the direction along which a volume of the first cylinder chamber 211 is contracted (reduced), and the backward movement of the first piston 213 may indicate that the first piston 213 moves in the other direction along which a volume of the first cylinder chamber 211 is expanded (increased). The first elastic member 21 may be disposed between the first protrusion member 252 provided to the push rod 14 and a protrusion part 222a provided to the side of the second housing 222 to be described later.

The second cylinder part 220 may include a second piston 223, a second cylinder chamber 221, and a second sealing member 224. The second piston 223 may move forward or backward along the inner surface of the second housing 222 by an interlocking unit 250 connected to the push rod 14. The second cylinder chamber 221 may accommodate the operating fluid therein. The second sealing member 224 may seal a gap or space between the second piston 223 and any one of the second housing 222 and the first housing 212. The volume of the second cylinder chamber 221 may be decided by forward and backward movement of the second piston 223. The forward and backward movement of the first piston 213 and the forward and backward movement of the second piston 223 may be sequentially carried out.

The second housing 222 may have a gap or space in which the second piston 223 reciprocates, and may form an opening in a flow passage toward the reservoir unit 30. The second housing 222 may include the second cylinder chamber 221, a volume of which is changed by the second piston 223.

The second cylinder chamber 221 may have a gap or space enclosed by all of the second piston 223, the inner surface of the second housing 222, and the outer surface of the first housing 212, and may store the operating fluid therein. The volume of the second cylinder chamber 221 may be changeable by the second piston 223 pressed by the first protrusion member 252. In this case, the volume of the second cylinder chamber 221 is contracted (reduced) when the second piston 223 moves forward, and is then expanded (increased) when an extension member 253 of the second piston 223 is caught in a second protrusion member 255 provided to the returning push rod 14 caused by the first elastic member 215 and the second piston 223 thus moves back to the original position thereof.

The second piston 223 reciprocating in the second cylindrical housing 222 may control the second cylinder chamber 221 to be contracted by force that is delivered from the pedal unit 20 to the extension member 253 through the first protrusion member 252, thereby providing better pedal feel to the driver of the vehicle. In this case, the second sealing member 224 may be provided at each of the outer circumferential surface and the inner circumferential surface of the second piston 223, such that the operating fluid stored in the second cylinder chamber 221 is prevented from leaking in the backward direction of the second piston 223. A stopper projection 222b provided to the second housing 222 may decide an initial position of the second piston 223, and may restrict the backward movement (retreating) range of the second piston 223.

The volume elastic unit 230 may include a volume elastic unit chamber 231, a volume elastic unit piston 233, a volume elastic unit housing 232, a sealing member 234, and an elastic member 235. The volume elastic unit chamber 231 may store the operating fluid therein. The volume elastic unit housing 232 may form a space in which the volume elastic unit piston 233 moves forward and backward. The sealing member 234 may seal the volume elastic unit chamber 231. The elastic member 235 may provide elastic force to the volume elastic unit piston 233.

In this case, the volume elastic unit chamber 231 may be located opposite to the volume elastic unit elastic member 235 on the basis of the volume elastic unit piston 233. The volume elastic unit chamber 231 may be connected to the second cylinder chamber 221 through the coupling part L240, such that the volume elastic unit chamber 231 may exchange the operating fluid with the second cylinder chamber 221.

In other words, the volume elastic unit 230 may have an empty space located at the front of the volume elastic unit piston 233 in the forward direction of the volume elastic unit piston 233 by hydraulic pressure operating in the second cylinder chamber 221. The volume elastic unit chamber 231 may be provided at the rear of the volume elastic unit piston 233. In this case, forward movement of the piston 233 may indicate that the piston 233 moves in the expansion direction of the volume elastic unit chamber 231, and backward movement of the piston 233 may indicate that the piston 233 moves in the contraction direction of the volume elastic unit chamber 231.

The interlocking unit 250 may be a means for transmitting force received from the pedal unit 10 or the first cylinder part 110 to the second cylinder part 220. The interlocking unit 250 may include the first protrusion member 252 and the extension member 253. The first protrusion member 252 may protrude in the lateral direction of the push rod 14. The extension member 253 may protrude in the lateral direction of the second piston 223, and may be spaced apart from the first protrusion member 252 by a separation space 251. The forward and backward movement of the first piston 213 may be performed independently of the forward and backward movement of the second piston 223.

An elastic element 254 and the separation space 251 may be disposed between the first protrusion member 252 and the extension member 253 or may be disposed between the first protrusion member 252 and the second piston 223, such that the forward and backward movement of the first piston 213 and the forward and backward movement of the second piston 223 may be sequentially carried out.

The separation space 251 may be provided in a manner that the first cylinder part is first pressed and the second cylinder unit 220 is then pressed. The first cylinder chamber 211 is first compressed by forward movement of the first piston 213 affected by the pedal unit 10, the first piston 213 moves forward by the separation space 251, and the first protrusion member 252 finally presses the second piston 223. In this case, the first protrusion member 252 may protrude in the lateral direction of the push rod 14, and may press the extension member 253 provided to the second piston 223 through the elastic element 254.

The elastic element 254 may be disposed between the extension member 253 and the first protrusion member 252, and may mitigate impact generated when the first protrusion member 252 is in contact with the extension member 253. The first protrusion member 252 may move forward simultaneously with the push rod 14 moving forward, such that impact applied to the extension member 253 is reduced.

The brake line L210 may connect the first cylinder chamber 211 to the wheel brake unit 20, and may supply the operating fluid pressed by contraction of the first cylinder chamber 211 to the caliper of the wheel brake unit 20, such that braking force may be delivered to wheels. The reservoir line L220 may connect the first cylinder chamber 211 to the reservoir unit 30, and may thus supply the operating fluid stored in the reservoir unit 30 to the first cylinder chamber 211.

A simulator line L230 may connect the reservoir unit 30 to the second cylinder chamber 221, such that the operating fluid may be supplied to the second cylinder chamber 221 or may return to the reservoir unit 30. The simulator line L130 may include an electronic control valve L231 and a check valve L232. The electronic control valve L231 may be controlled by the electronic control unit (ECU). The check valve L232 may be arranged parallel to the electronic control valve L231, and may allow the operating fluid to flow from the reservoir unit 30 only to the second cylinder chamber 221. That is, the check valve L232 may act as a one-way valve. The ECU is a control device to adjust an operation mode of the brake system. The ECU may open or close the electronic control valve L231 or the like according to a control scheme based on any one of various modes, for example, a general operation mode, a fallback mode, etc.

The coupling part L240 may be a connector disposed between the second cylinder part 220 and the volume elastic unit 230, such that a volume of the volume elastic unit chamber 231 may be changed by pressure generated in the second cylinder chamber 221.

The electronic brake system according to the sixth embodiment has been disclosed as described above. In the sixth embodiment, the above-mentioned constituent elements are combined with one another in a manner that the first piston 213 and the second piston 223 may sequentially move forward and backward, such that the first cylinder chamber 211 and the second cylinder chamber 221 may be contracted at different times.

Referring to FIG. 7, the electronic brake system according to the seventh embodiment may include the first cylinder part 210 and the second cylinder part 22 in only one housing 260. The housing 260 may have a dual cylinder structure that is composed of two cylinder parts each having at least one stepped portion.

In more detail, the first piston 213 moves forward and backward in one of two cylinder parts of the dual cylinder structure, and the second piston 223 moves forward and backward in the other one of the two cylinder parts of the dual cylinder structure. The housing 260 may further include a protrusion part 260a to support one end of the first elastic member 215, and a stopper projection 260b to restrict the retreating range of the second piston 223.

Referring to FIG. 8, according to the eighth embodiment, the housing 260 in which the first cylinder part 210 and the second cylinder part 220 shown in the seventh embodiment are incorporated into one body may include a guide part 261 to guide movement of the first piston 213, and a fixed sealing member 262 fixed at the inner wall of the housing 260.

Referring to FIG. 8, according to the ninth embodiment, a movement restriction member 256 for restricting the contraction range of the elastic element 254 may be provided in the elastic element 254 disposed between the extension member 253 and the first protrusion member 252, such that the movement restriction member 256 may prevent damage caused by excessive contraction of the elastic element 254, resulting in an increased lifespan of the elastic element 254.

Figure 10:
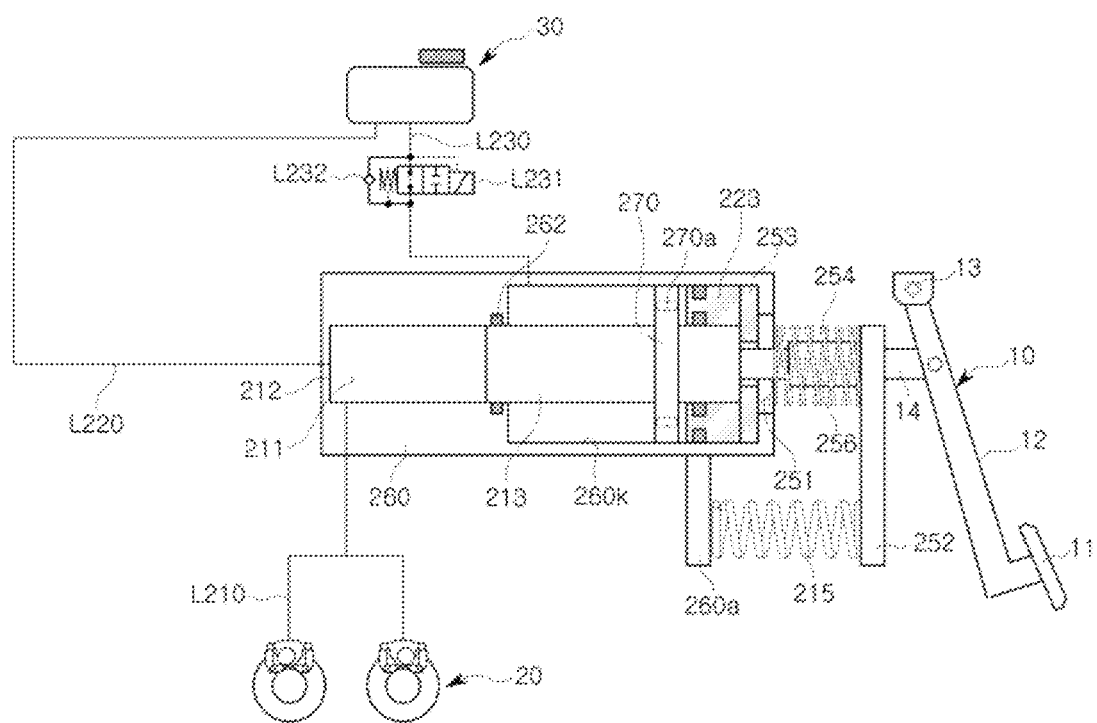
FIG. 10 is a view illustrating an electronic brake system according to a tenth embodiment of the present disclosure.
Figure 11:
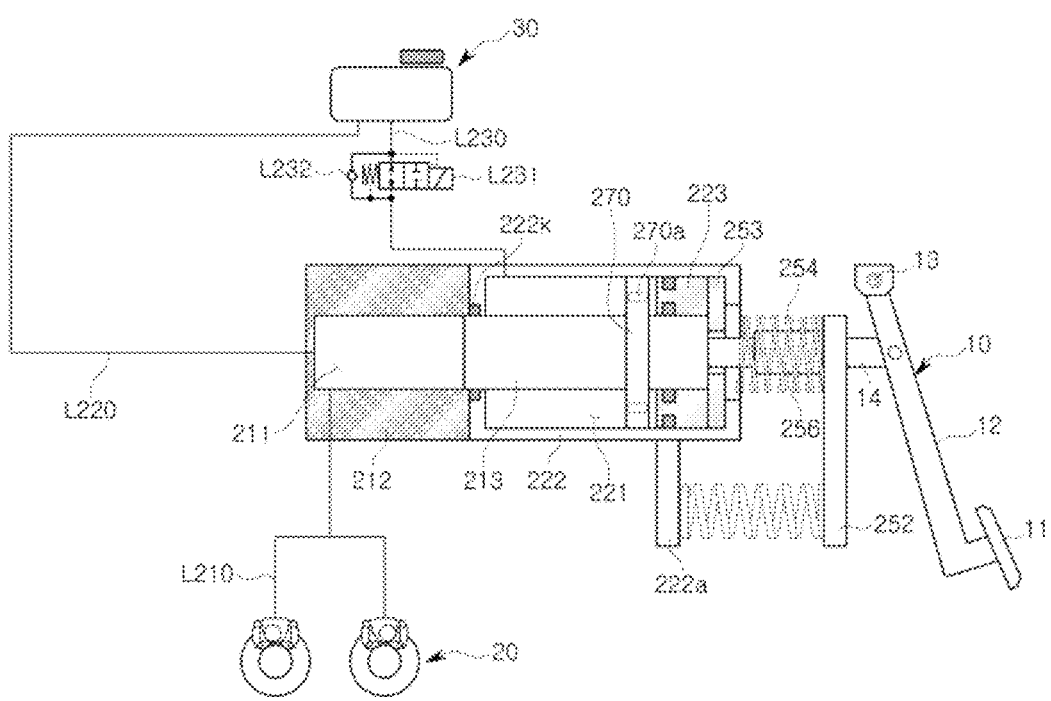
FIG. 11 is a view illustrating an electronic brake system according to an eleventh embodiment of the present disclosure.
Figure 12:
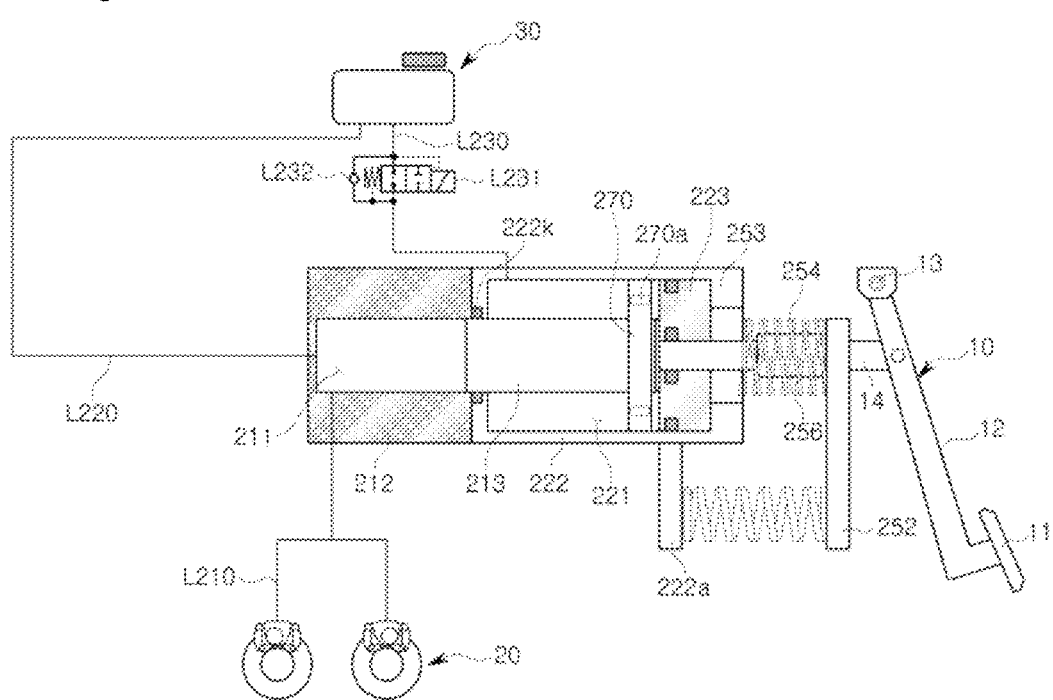
FIG. 12 is a view illustrating an electronic brake system according to a twelfth embodiment of the present disclosure.

FIG. 10 is a view illustrating an electronic brake system according to a tenth embodiment of the present disclosure. FIG. 11 is a view illustrating an electronic brake system according to an eleventh embodiment of the present disclosure. FIG. 12 is a view illustrating an electronic brake system according to a twelfth embodiment of the present disclosure. Referring to FIG. 10, according to the tenth embodiment, the first piston 213 may include an overhang part 270 that is guided by the inner surface 260k of the housing 250 in which the second piston moves forward and backward. The overhang part 270 may be configured to compensate for the straightness of the first piston 223. In this case, the overhang part 270 may be provided with an overhang orifice 270a generating flow resistance, and may prevent sudden forward/backward movement of the first piston 223, resulting in increased stability.

Referring to FIG. 11, the housing having a space in which the first piston 213 and the second piston 223 move forward and backward according to the eleventh embodiment may include the first housing 212 forming the first cylinder chamber 211 and the second housing 222 forming the second cylinder chamber 221. The first housing 212 and the second housing 222 may be coupled in series to each other. In this case, a sealing member 222k sealing the first cylinder chamber 211 may be a fixed-type sealing member provided to one side of the second housing 222.

Referring to FIG. 12, according to the twelfth embodiment, a separate extension member is not coupled to the second piston 223, and the second piston 223 may be directly pressed by the first piston 213 so that the second piston 223 may move backward. Differently from the eleventh embodiment in which the second piston 223 moves backward through the extension member 253 during backward movement of the first piston 213, the second piston 223 according to the twelfth embodiment may directly contact the first piston or the overhang part 270 during backward movement of the first piston 213 so that the second piston 223 of the twelfth embodiment may move backward along with the first piston 213.

Figure 13:
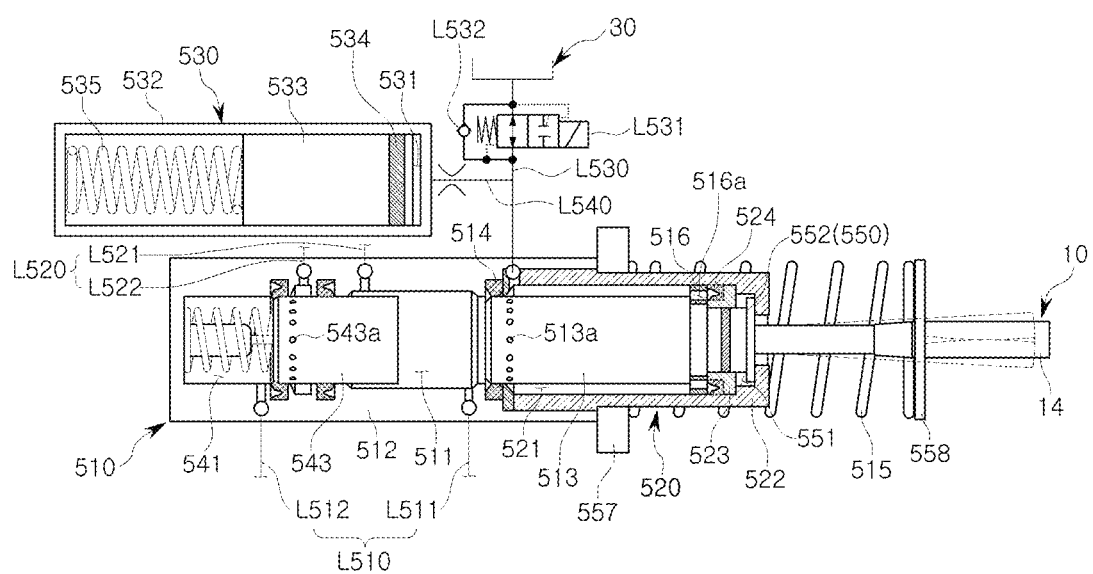
FIG. 13 is a view illustrating an electronic brake system according to a thirteenth embodiment of the present disclosure.
Figure 14:
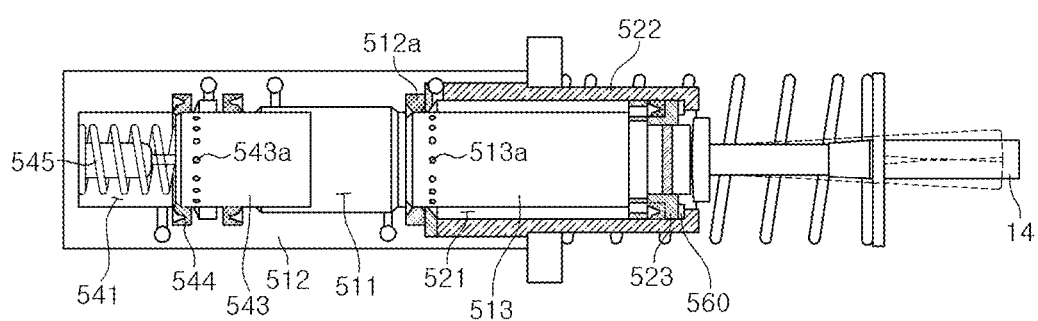
FIG. 14 is a view illustrating an electronic brake system according to a fourteenth embodiment of the present disclosure.
Figure 15:
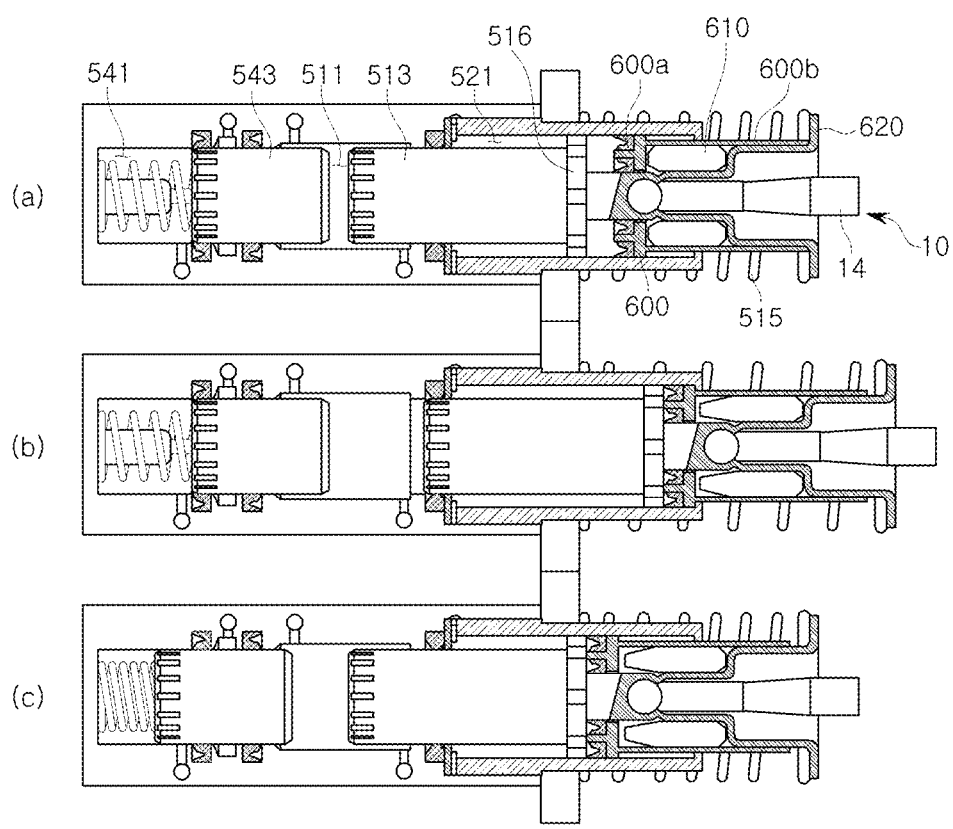
FIG. 15 is a view illustrating an electronic brake system according to a fifteenth embodiment of the present disclosure.

FIG. 13 is a view illustrating an electronic brake system according to a thirteenth embodiment of the present disclosure. FIG. 14 is a view illustrating an electronic brake system according to a fourteenth embodiment of the present disclosure. FIG. 15 is a view illustrating an electronic brake system according to a fifteenth embodiment of the present disclosure.

Referring to FIG. 13, the electronic brake system according to the thirteenth embodiment may broadly include a first cylinder part 510, a second cylinder part 520, a pedal unit 10, and a reservoir unit 30. In the electronic brake system of FIG. 13, the first cylinder part 520 may be attached in series to the second cylinder 520. That is, the first housing 512 and the second housing 522 are coupled in series to each other, so that the first housing 512 and the second 522 may be incorporated into one body.

The first cylinder part 510 may generate hydraulic pressure in the first cylinder chamber 511 by the first piston 513 pressed by the push rod 14, such that the operating fluid may be supplied to the wheel brake unit or the reservoir unit 30. The first cylinder part 510 may include the first housing 512 in which the first piston 513 moves forward and backward, and a fixed-type first sealing member 514 to maintain airtightness between the first piston 513 and the first housing 512.

The first housing 512 may have a space in which the first piston 513 reciprocates, and may form an opening in a flow passage toward the reservoir unit 30 or the wheel brake unit 20. The first housing 512 may include the first cylinder chamber 511, a volume of which is changed by the first piston 513.

The first cylinder chamber 511 may have a space enclosed by the first piston 513 and the inner surface of the first housing 512, may store the operating fluid therein, and may be pressed by the pedal unit 10. The first cylinder chamber 511 is disposed to communicate with a first brake line L511 and a first reservoir line L521.

The first piston 513 reciprocating in the first cylindrical housing 512 may control the first cylinder chamber 511 to be contracted by a pedal effort of the pedal unit 10, such that the operating fluid can be supplied to the wheel brake unit 20. In this case, the first sealing member 514 may be fixed at the inner circumferential surface of the first housing 512, such that the operating fluid stored in the first cylinder chamber 511 is prevented from leaking in the backward direction of the first piston 513. A third piston 543 for allowing the first cylinder chamber 511 and the third chamber 541 to be divided from each other may be provided at the front of the first piston 513, and each of the first cylinder chamber 511 and the third chamber 541 may be connected to at least one wheel brake unit.

The first elastic member 515 may be a compression spring that is compressed by forward movement of the push rod 14 and provides elastic force in the backward direction of the piston 513. In this case, the forward movement of the first piston 513 may indicate that the first piston 513 moves in the direction along which a volume of the first cylinder chamber 511 is contracted (reduced), and the backward movement of the first piston 513 may indicate that the first piston 513 moves in the other direction along which a volume of the first cylinder chamber 511 is expanded (increased). The first elastic member 515 may be disposed between a first support member 557 provided at the side of the second housing 522 and a second support member 558 provided at the push rod 14.

An overhang part 516 arranged at the rear of the first piston 513 may be formed in a disc shape in a manner that the overhang part 516 may have the same diameter as the inner diameter of the space in which the second piston 523 moves forward and backward within the second housing 522. The overhang part 516 may be provided with an overhang orifice 516a generating flow resistance, and may prevent sudden forward/backward movement of the first piston 513, resulting in increased stability of the brake system.

The second cylinder part 520 may include a second piston 523, a second cylinder chamber 521, and a second sealing member 524. The second piston 523 may move forward or backward along the inner surface of the second housing 522 by an interacting unit 550 coupled to the push rod 14. The second cylinder chamber 521 may accommodate the operating fluid therein. The second sealing member 524 may seal a gap or space between the second piston 523 and any one of the first housing 512 and the second housing 522. A volume of the second cylinder chamber 521 may be decided by forward and backward movement of the second piston 523. The forward and backward movement of the first piston 513 may be performed independently of the forward and backward movement of the second piston 523.

The second housing 522 may have a gap or space in which the second piston 523 reciprocates, and may form an opening in a flow passage toward the reservoir unit 30 or the volume elastic unit 530. The second housing 522 may include the second cylinder chamber 521, a volume of which is changed by the second piston 523.

The second cylinder chamber 521 may have a gap or space enclosed by the second piston 523 and the inner surface of the second housing 522, may store the operating fluid therein, and may have a volume that is changeable by the second piston 523 pressed by a first protrusion member 552. The volume of the second cylinder chamber 521 is contracted (reduced) when the second piston 523 moves forward, and is then expanded (increased) when the second piston 523 is pressed by the overhang part 516 provided to the returning first piston 513 caused by the first elastic member 515 and then moves back to the original position thereof.

The second piston 523 reciprocating in the second cylindrical housing 522 may control the second cylinder chamber 521 to be contracted by force that is delivered from the pedal unit 10 through the first protrusion member 552, thereby providing better pedal feel to the driver of the vehicle. In this case, the second sealing member 524 may be provided to the second piston 523, such that the operating fluid stored in the second cylinder chamber 521 is prevented from leaking in the backward direction of the second piston 523. A stopper projection provided to the second housing 522 may decide an initial position of the second piston 523, and may restrict the backward movement (retreating) range of the second piston 523.

The volume elastic unit 530 may include a volume elastic unit chamber 531, a piston 533, a housing 532, a sealing member 534, and an elastic member 535. The volume elastic unit chamber 531 may store the operating fluid therein. The housing 532 may form a space in which the piston 533 moves forward and backward. The sealing member 234 may seal the chamber 531. The elastic member 235 may provide elastic force to the piston 533. In this case, the volume elastic unit chamber 531 may be located opposite to the volume elastic unit elastic member 535 on the basis of the volume elastic unit piston 533. The volume elastic unit chamber 531 may be connected to the second cylinder chamber 521 through the coupling part L540, such that the volume elastic unit chamber 531 may exchange the operating fluid with the second cylinder chamber 521. That is, the volume elastic unit chamber 531 may be expanded when the piston 533 moves forward by hydraulic pressure operating in the second cylinder chamber 521, and may be contracted when the piston 533 moves backward by the hydraulic pressure operating in the second cylinder chamber 521.

The third chamber 541 may be divided by the third piston 543 within the space pressed by the first piston 513 of the first housing 512. That is, the space pressed by the first piston 513 in the first housing 512 may be divided into the first cylinder chamber 511 and the third chamber 541. In this case, an orifice 543a may be formed in the third piston 543, thereby generating flow resistance. The third sealing member 544 may seal the space among the third piston 543, the first cylinder chamber 511, and the third chamber 541. The third elastic member 545 may supply elastic force to the third piston 543 in the expansion direction of the third chamber 541.

The interlocking unit 550 may be a means for transmitting force delivered from the push rod 14 of the pedal unit 10 to the second cylinder part 120. The interlocking unit 150 may include the first protrusion member 552 and the separation space 551. The first protrusion member 552 may protrude in the lateral direction of the push rod 14. The separation space 551 may be disposed between the first protrusion member 552 and the second piston 523, such that the forward and backward movement of the first piston 513 and the forward and backward movement of the second piston 523 may be sequentially carried out.

The separation space 551 may allow the pedal unit 10 to sequentially press the first cylinder part 510 and the second cylinder part 520. In more detail, after the first cylinder chamber 511 is first compressed by the first piston 513 moving forward by the pedal unit 10, the first piston 113 moves forward by the separation space 151, such that the first protrusion member 552 then presses the second piston 523. In this case, the first protrusion member 552 may protrude in the lateral direction of the push rod 14, and may press the second piston 123 when the push rod 14 moves forward.

The brake line L510 may connect the first cylinder chamber 511 or the third chamber 541 to the wheel brake unit 20, and may supply the operating fluid pressed by contraction of the first cylinder chamber 511 or the third chamber 541 to the caliper of the wheel brake unit 20, such that braking force may be delivered to wheels. The reservoir line L520 may connect the first cylinder chamber 511 or the third chamber 541 to the reservoir unit 30, and may thus supply the operating fluid stored in the reservoir unit 30 to the first cylinder chamber 511 or the third chamber 541.

A simulator line L530 may connect the reservoir unit 30 to the second cylinder chamber 521, such that the operating fluid may be supplied to the second cylinder chamber 521 or may return to the reservoir unit 30. The simulator line L130 may include an electronic control valve L531 and a check valve L532. The electronic control valve L531 may be controlled by the ECU. The check valve L532 may be arranged parallel to the electronic control valve L531, and may allow the operating fluid to flow from the reservoir unit 30 only to the second cylinder chamber 521. That is, the check valve L532 may act as a one-way valve. The ECU is a control device to adjust an operation mode of the brake system. The ECU may open or close the electronic control valve L531 or the like according to a control scheme based on any one of various modes, for example, a general operation mode, a fallback mode, etc.

The coupling part L540 may be a connector disposed between the second cylinder part 520 and the volume elastic unit 530, such that a volume of the volume elastic unit chamber 531 may be changed by pressure generated in the volume of the second cylinder chamber 521.

The electronic brake system according to the thirteenth embodiment has been disclosed as described above. In the thirteenth embodiment, the above-mentioned constituent elements are combined with one another in a manner that the first piston 513 and the second piston 523 may sequentially move forward and backward, such that the first cylinder chamber 511 and the second cylinder chamber 521 may be contracted at different times.

Referring to FIG. 14, according to the fourteenth embodiment, an elastic element 560 may be disposed between the second housing 522 and the second piston 523, such that the elastic element 560 may mitigate impact applied to the second housing 522 when the second piston 523 moves forward.

Referring to FIG. 15, according to the fifteenth embodiment, at a contact position between the overhang part 516 and the second piston 600 during backward movement of the first piston 513, the second piston 600 may include a contact part 600a formed at the contact position and a movement restriction part 600b restricting the contraction range of the elastic element 610.

A first protrusion member 620 may be coupled to the push rod 14, such that the first protrusion member 620 may supply forward force to the second piston 600 during activation of the push rod 14. An elastic element 610 may be disposed between the second piston 600 and the first protrusion member 620, and the movement restriction member 600b may allow the distance between the first protrusion member 620 and the second piston 600 to be kept at a predetermined distance or greater.

The electronic brake system according to the fifteenth embodiment has been disclosed as described above. The following electronic brake system will hereinafter be described with reference to the Brake-by-Wire mode (a), the non-operation mode (b), and the fallback mode (c) shown in FIG. 15. The above-mentioned operation modes (a), (b), and (c) may be selectively driven by the ECU according to various situations.

In the Brake-by-Wire mode (a), pressure is not applied to the inside of the first cylinder chamber 511 during activation of the pedal unit 10, such that braking force is not directly supplied to the wheel brake unit and pressure occurs in the second cylinder chamber 521, thereby providing better pedal feel to the driver. In this case, the driver's braking intention may be delivered electrically. For example, an actuator (not shown) to electrically generate braking force may be provided so that braking force may be supplied to the wheel brake unit. In this case, the elastic element 610 may be pressed and contracted between the second piston 600 and the first protrusion member 520, and the movement restriction member 600b may restrict the movement range of the first protrusion member 520, such that the contraction range of the elastic element 610 may be restricted.

In the non-operation mode (b), forward force is not applied to the first piston 513, the elastic element 610 may return to the original position thereof, and the first piston 513 and the second piston 600 may respectively return to the initial positions thereof by elastic force of the first elastic member 515.

In the fallback mode (c) indicating a failure state, during activation of the pedal unit 10, pressure is not applied to the second cylinder chamber 521, and pressure is applied to the first cylinder chamber 511 and the third chamber 541, such that braking force can be directly delivered from the first cylinder chamber 511 or the third chamber 541 to the wheel brake unit.

As is apparent from the above description, the electronic brake system according to the embodiments of the present disclosure may allow the first piston and the second piston to sequentially move forward and backward, such that the first cylinder chamber and the second cylinder chamber are contracted at different times.

The electronic brake system may insert the elastic element between the first protrusion member and the second piston so as to contract the first cylinder chamber and the second cylinder chamber at different times, and may mitigate impact generated when the first protrusion member is in contact with the second piston.

The movement restriction member for restricting the contraction range of the elastic member may be disposed between the second piston and the first protrusion member to prevent the elastic element from being contracted by more than a threshold range of the elastic element, such that the elastic element is prevented from being damaged in advance.

The electronic brake system according to the embodiments of the present disclosure may further include the volume elastic unit provided with a volume elastic unit chamber communicating with the second cylinder chamber, thereby providing better pedal feel to the driver of the vehicle.

The first cylinder part and the second cylinder part may have a dual piston structure, and may simultaneously receive elastic force through a single elastic member when moving backward, resulting in reduction of space waste and production costs.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An electronic brake system which includes a first housing having a first cylinder chamber hydraulically connected to a wheel brake unit, a first piston connected with a push rod of a pedal unit so as to press an operating fluid stored in the first cylinder chamber by the wheel brake unit, and a second cylinder chamber connected to a reservoir unit through a flow passage opened or closed by an electronic control valve, the electronic brake system comprising:

the second cylinder chamber, a volume of which is variable by forward and backward movement of a second piston, wherein the second piston is movable by a protrusion of the push rod of the pedal unit such that forward and backward movement of the first piston and forward and backward movement of the second piston are performed independently of each other.

2. The electronic brake system according to claim 1, further comprising:

a second housing configured to form a space in which the second piston moves forward and backward.

3. The electronic brake system according to claim 2, wherein the second housing is connected in series to the first housing.

4. The electronic brake system according to claim 3, wherein the first piston includes:

an overhang part guided by an inner surface of the second housing in which the second piston moves forward and backward.

5. The electronic brake system according to claim 4, wherein the overhang part includes an overhang orifice to generate flow resistance.

6. The electronic brake system according to claim 1, wherein the forward and backward movement of the first piston and the forward and backward movement of the second piston are independently performed by an elastic element disposed between the second piston and the protrusion of the push rod of the pedal unit.

7. The electronic brake system according to claim 6, further comprising:

a movement restriction member disposed between the second piston and the protrusion of the push rod of the pedal unit, the movement restriction member configured to restrict a contraction range of the elastic element.

8. The electronic brake system according to claim 1, further comprising:

a first elastic member configured to provide elastic force in a backward direction of the first piston.

9. The electronic brake system according to claim 8, wherein:

the second piston is in contact with the first piston by backward movement of the first piston; and
the second piston moves backward along with the first piston.

10. An electronic brake system which includes a first housing having a first cylinder chamber hydraulically connected to a wheel brake unit, a first piston connected to a pedal unit so as to press an operating fluid stored in the first cylinder chamber by the wheel brake unit, and a second cylinder chamber connected to a reservoir unit through a flow passage opened or closed by an electronic control valve, the electronic brake system comprising:

the second cylinder chamber, a volume of which is decided by forward and backward movement of a second piston, wherein the second piston is activated by at least one interlocking unit such that forward and backward movement of the first piston and forward and backward movement of the second piston are performed independently of each other; and a third piston provided at a front of the first piston such that the first cylinder chamber and a third cylinder chamber are divided from each other by the third piston, wherein each of the first cylinder chamber and the third cylinder chamber is connected to at least one wheel brake unit.

11. The electronic brake system according to claim 10, wherein the first piston or the third piston includes a flow passage that is opened by backward movement of the first or third piston or is closed by forward movement of the first or third piston.

12. The electronic brake system according to claim 1, wherein the protrusion is provided to the push rod of the pedal unit, and is configured to directly press the second piston.

13. The electronic brake system according to claim 1, wherein the forward and backward movement of the first piston and the forward and backward movement of the second piston are independently performed by a separation space between the second piston and the protrusion of the push rod of the pedal unit.

14. The electronic brake system according to claim 1, wherein the forward and backward movement of the first piston and the forward and backward movement of the second piston are independently performed by a separation space and an elastic element disposed between the second piston and the protrusion of the push rod of the pedal unit.

15. The electronic brake system according to claim 1, further comprising:

a volume elastic unit hydraulically connected to the second cylinder chamber.

16. The electronic brake system according to claim 1, further comprising:

a fixed-type first sealing member mounted to an inner surface of the first housing.

17. The electronic brake system according to claim 1, further comprising:

a brake line configured to interconnect the first cylinder chamber and a wheel brake unit; and a reservoir line configured to interconnect the first cylinder chamber and a reservoir unit.

18. An electronic brake system which includes a first housing having a first cylinder chamber hydraulically connected to a wheel brake unit, a first piston connected to a pedal unit so as to press an operating fluid stored in the first cylinder chamber by the wheel brake unit, and a second cylinder chamber connected to a reservoir unit through a flow passage opened or closed by an electronic control valve, the electronic brake system comprising:

the second cylinder chamber, a volume of which is decided by forward and backward movement of a second piston, wherein the second piston is activated by at least one interlocking unit such that forward and backward movement of the first piston and forward and backward movement of the second piston are performed independently of each other;

a simulator line configured to interconnect the second cylinder chamber and a reservoir unit; and a check valve connected in parallel to the electronic control valve through the simulator line so as to permit only one-way flow ranging from the reservoir unit to the second cylinder chamber.

19. The electronic brake system according to claim 14, further comprising: a movement restriction member disposed between the second piston and the interlocking units, configured to restrict a contraction range of the elastic element.

* * * * *